June 15, 1926.
C. F. MEIER
DRIVE CHAIN
Filed Dec. 23, 1921
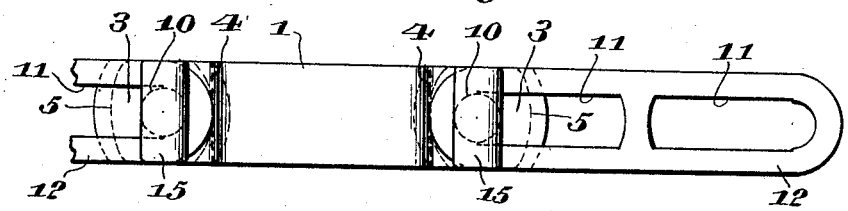
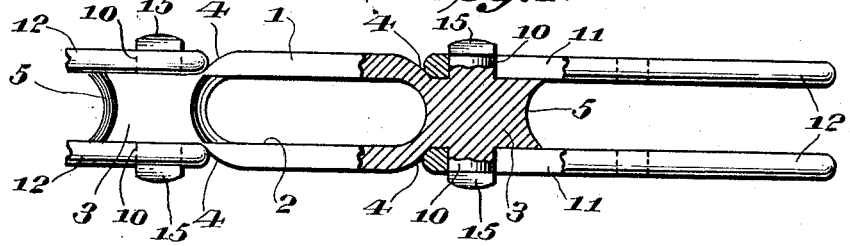
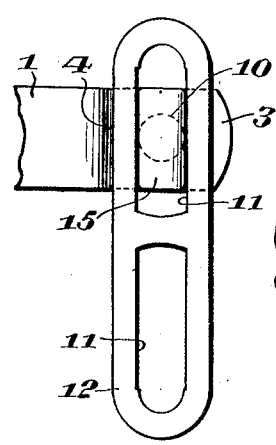
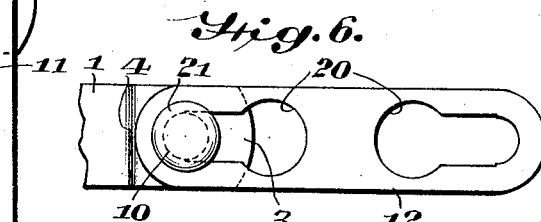
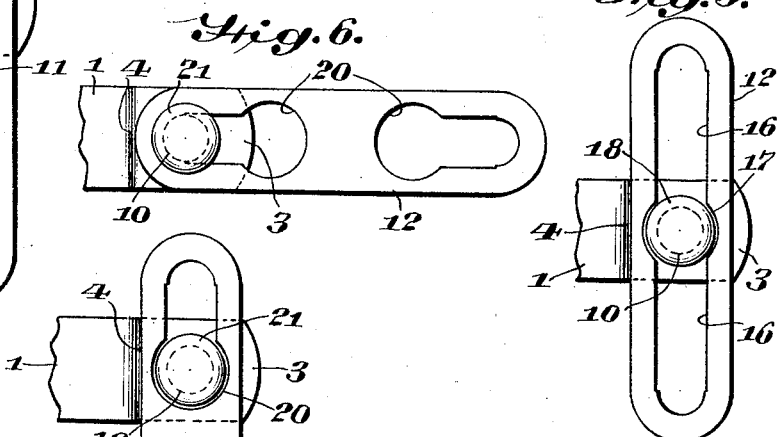
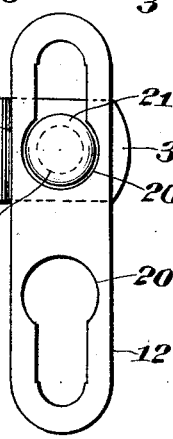
INVENTOR.
Charles Frederick Meier
BY Cyrus N. Anderson
ATTORNEY.

Patented June 15, 1926.

1,589,201

UNITED STATES PATENT OFFICE.

CHARLES FREDERICK MEIER, OF WHITE HAVEN, PENNSYLVANIA, ASSIGNOR TO WILMOT ENGINEERING COMPANY, OF HAZLETON, PENNSYLVANIA, A CORPORATION OF PENNSYLVANIA.

DRIVE CHAIN.

Application filed December 23, 1921. Serial No. 524,348.

My invention relates to drive chains and it has for its object to provide a chain having alternate solid links of improved and novel construction.

The object is to provide said alternate solid links with means for preventing lengthwise collapsing or shortening of the chain when in use.

To these and other ends the invention comprehends the construction and arrangement of parts as hereinafter described and particularly set forth in the claims.

In order that the invention may be more easily understood and its practical advantages fully appreciated reference may be had to the accompanying drawing in which certain forms of embodiment thereof are depicted, but it will be understood that changes in the details of construction may be made within the scope of the claims.

In the drawing:

Fig. 1 is a view in side elevation of a portion of chain embodying my invention;

Fig. 2 is a view partly in top plan and partly in horizontal section of a portion of chain embodying my invention;

Fig. 3 is a view in side elevation of adjacent links with one of the said links arranged at right angles to the other of said links;

Fig. 4 is a view in side elevation of a short portion of chain showing a slightly modified construction embodying the invention;

Fig. 5 is a view in side elevation of the structure shown in Fig. 4 with one of the links arranged substantially at right angles to the other of said links;

Fig. 6 is a view similar to that of Fig. 4 showing still another slight modification of construction embodying the invention; and Fig. 7 is a view in side elevation of the structure shown in Fig. 6 with one of the links arranged substantially at right angles to the other.

Referring to the drawings: 1 designates a solid link the intermediate or central portion of which is enlarged and provided with a vertical slot extending therethrough, as indicated at 2, the opposite ends of which are of arc shape as shown. The opposite end portions 3 of the link are flattened and are of substantially rectangular shape in cross section. Shoulders 4 are provided or formed between the opposite end relatively thin portions 3 and the intermediate thickened portion of the link 1. The opposite ends of the link 1 terminate in arc shaped surfaces, as indicated at 5, against which surfaces the teeth of a sprocket wheel are adapted to contact in the use of the chain. The said teeth enter the slots 2 and contact with the arc shaped surfaces at the opposite ends of the said slots through the intermediate enlarged portion of the links 1. The vertical surfaces at the opposite ends of the said slots are of arc-shape for the purpose of causing the said ends to conform to the teeth of the sprocket wheels over which the chains embodying the links may travel. In other words, it is the purpose of said vertical arc-shaped surfaces to improve the cooperation between the said links and the supporting and driving sprockets. The chain is adapted to be driven by sprocket teeth in contact with these surfaces. These driving surfaces are actually of convex shape vertically and concave shape horizontally, as shown, thus reducing friction and preventing the chain from riding up on the sprocket teeth.

The opposite flattened end portions 3 of the links 1 are provided with laterally extending pivot projections 10 which extend through slots 11 in the opposite ends of the side members of links 12. The opposite ends of the side members of the links 12 occupy positions adjacent to or in contact with the shoulders 4 of the links 1. Such relationship between these ends and the said shoulders prevents collapsing or shortening of the chain in use. It is apparent that the side members of the links 12 cannot move longitudinally relatively to the links 1 because such movement would be prevented by contact of the ends thereof with the shoulders 4.

In the construction as shown in Figs. 1 to 3 inclusive, the pivot portions 10 are provided with oblong retaining heads 15 which extend transversely of the chain and contact with the outer sides of the side members of the links 12 and retain the latter upon the said pivot portions 10. In order to disconnect the chain links the side members of a link 12 are turned into positions at right angles to the length of the adjacent link 1, as indicated in Fig. 3, after which the opposite side members may be removed from the pivot portions, as is apparent from said Fig. 3.

In the construction as shown in Figs. 4 and 5 the opposite side members of the links 12 are provided with slots or openings 16 which terminate near the opposite ends thereof. These slots are continuous and are provided at their centers with enlarged circular portions, as indicated at 17. The pivot portions 10 which project from the opposite sides of the flattened portions 3 of the link 1 are provided with circular heads 18. In order to separate any two adjacent links the opposite side members of the link 12 are turned into position as indicated in Fig. 5 and adjusted so as to bring the enlarged circular portions 17 in registry with the circular heads 18, whereupon the opposite side members of the said links 12 may be moved outwardly over the said heads so as to disconnect the said links.

The construction as shown in Figs. 6 and 7 differs from that shown in Fig. 1 in that the inner ends of the slots 11 in the side members 12 terminate in circular enlarged portions 20 while the pivot portions 10 terminate in circular heads 21. When it is desired to disconnect any two adjacent links the opposite side members of the link 12 are turned or adjusted into position as indicated in Fig. 7 and adjusted so that the enlarged circular portions 20 therein register with the circular heads 21. It is apparent that the said side members may be readily removed and the said links disconnected from each other.

It will be understood that the chain links 1 and 12 alternate with each other throughout the length of the chain.

It will be seen that I have provided a construction of chain which is simple and strong and which is well adapted for the efficient performance of the heavy duty work to which such chains are subjected.

Having thus described my invention what I claim and desire to secure by Letters Patent is:

1. A drive chain comprising alternate solid links and links comprising oppositely disposed side members, the said solid links respectively comprising intermediate enlarged portions having vertical longitudinally extending slots therethrough, the opposite ends of which terminate in vertical arc-shaped surfaces and flattened portions at their opposite ends, the said flattened portions having oppositely projecting pivot portions in engagement with the outer ends of slots in the said side members and means for retaining said side members upon said pivot portions.

2. A drive chain comprising solid links and links consisting of oppositely disposed side members, the said links being arranged alternately, the intermediate portion of each of said solid links being of greater thickness than the opposite end portions thereof and having vertical longitudinally extending slots therethrough, the opposite ends of which terminate in vertical arc-shaped surfaces, and the said intermediate portion terminating in shoulders at the inner ends of the opposite sides of the said opposite end portions, and the latter portions being provided with pivot projections extending laterally therefrom for engagement in openings in the said oppositely disposed side members of adjacent links.

3. A drive chain comprising solid links and links consisting of oppositely disposed side members, the said links being arranged alternately, the opposite side portions of each solid link being swelled outwardly so as to form with opposite end portions thereof shoulders and each solid link being provided with a vertical longitudinally extending slot therethrough, the opposite ends of which terminate in vertical arc-shaped surfaces, and the said opposite end portions being provided with laterally extending pivot portions in engagement with slots through the end portions of the side members of adjacent links, and means for retaining the side members of said links in engagement with said pivot portions.

4. A drive chain comprising solid links and links consisting of oppositely disposed side portions, the said links being arranged alternately and the said side portions each being provided with openings extending transversely therethrough, and the opposite sides of each of the said solid links being projected outwardly so as to form with opposite end portions thereof shoulders, and the said intermediate portion being provided with a vertical oblong opening extending therethrough, the opposite ends of which terminate in vertical arc-shaped surfaces, and the said opposite end portions each being provided with laterally extending pivot projections in engagement with slots in the end portions of the side members of adjacent links and the said pivot portions each terminating in heads which engage with the outer surfaces of the said side portions to retain them upon said pivot portions.

5. A drive chain comprising solid links and links consisting of oppositely disposed side members having openings extending transversely therethrough and each of the said solid links comprising flattened opposite end portions, and a portion intermediate said flattened end portions which is of substantially greater thickness than the said flattened opposite end portions, the joining of the said intermediate portion to the flattened opposite end portions providing shoulders, and the said intermediate portion being provided with a vertical oblong opening extending therethrough, the opposite ends of which terminate in vertical arc-shaped surfaces, and the said flattened opposite end portions each being provided with laterally and horizontally extending pivot portions in engagement with openings in the ends of the side members of adjacent links, and heads upon the said pivot portions which engage with the outer sides of said side members to retain the same upon said pivot portions.

6. A drive chain comprising alternate solid links and links comprising oppositely disposed side members, the vertical surfaces of the opposite ends of said solid links being of arc shape and the said solid links respectively comprising intermediate enlarged portions having vertical longitudinally extending slots therethrough the vertical surfaces of the opposite ends of which are of arc shape, and flattened portions at their opposite ends, the said flattened portions having oppositely projecting pivot portions in engagement with the outer ends of slots in the said side members, and the enlarged portions of the said solid links operating to retain said side members upon the said pivot portions.

7. A drive chain comprising alternate solid links and links comprising oppositely disposed side members, each of the surfaces of said solid links with which the teeth of sprocket wheels are adapted to be engaged being a convex-concave surface.

8. A drive chain comprising alternate solid links and links comprising oppositely disposed side members, the said solid links each having a vertical longitudinally extending slot therethrough, the opposite ends of the said slots and of the said solid links terminating in vertical arc-shaped surfaces.

In testimony that I claim the foregoing as my invention, I have hereunto subscribed my name this 19th day of December, A. D., 1921.

CHARLES FREDERICK MEIER.